US012090895B2

(12) United States Patent
Kapusky et al.

(10) Patent No.: US 12,090,895 B2
(45) Date of Patent: Sep. 17, 2024

(54) SEAT ASSEMBLY WITH POWER EASY ENTRY HAVING CONCENTRIC MOTION

(71) Applicant: Magna Seating Inc., Aurora (CA)

(72) Inventors: Michael Kapusky, South Lyon, MI (US); David M Runde, Ortonville, MI (US); Ronald A Zimmerman, II, White Lake, MI (US)

(73) Assignee: Magna Seating Inc., Aurora (CA)

( * ) Notice: Subject to any disclaimer, the term of this patent is extended or adjusted under 35 U.S.C. 154(b) by 0 days.

(21) Appl. No.: 17/799,773

(22) PCT Filed: Feb. 15, 2021

(86) PCT No.: PCT/US2021/018092
§ 371 (c)(1),
(2) Date: Aug. 15, 2022

(87) PCT Pub. No.: WO2021/163659
PCT Pub. Date: Aug. 19, 2021

(65) Prior Publication Data
US 2023/0182623 A1 Jun. 15, 2023

Related U.S. Application Data

(60) Provisional application No. 62/976,555, filed on Feb. 14, 2020.

(51) Int. Cl.
*B60N 2/02* (2006.01)
*B60N 2/12* (2006.01)
*B60N 2/20* (2006.01)

(52) U.S. Cl.
CPC ........... *B60N 2/02246* (2023.08); *B60N 2/12* (2013.01); *B60N 2/20* (2013.01); *B60N 2/02253* (2023.08)

(58) Field of Classification Search
CPC ........ B60N 2/02246; B60N 2/12; B60N 2/20; B60N 2/02253
(Continued)

(56) References Cited

U.S. PATENT DOCUMENTS

2016/0059752 A1* 3/2016 Kishida ............... B60N 2/02246
297/344.12
2017/0334314 A1* 11/2017 Takada ............... B60N 2/02246
(Continued)

FOREIGN PATENT DOCUMENTS

FR 2848928 6/2004
WO 2004076228 9/2004

*Primary Examiner* — Mark R Wendell
(74) *Attorney, Agent, or Firm* — Miller Canfield

(57) ABSTRACT

A seat assembly includes a cushion motor linked to a pinion gear for providing concentric rotation of a linkage through rotational engagement of the pinion gear with a sector gear. The seat assembly includes a seat back pivotally coupled to a seat cushion and a seat base adapted for mounting the seat assembly within an automotive vehicle. The linkage includes a front link and a rear link extending between the seat cushion and the seat base, wherein pivoting of the linkage moves the seat assembly between a plurality of positions. A recliner mechanism is operatively coupled to the front link for selectively allowing pivoting thereof, and the sector gear is fixed to the front link. Actuation of the cushion motor when the recliner mechanism is unlocked rotates the pinion gear, causing the sector gear to rotate for pivoting the linkage to move the seat assembly between the plurality of positions.

17 Claims, 11 Drawing Sheets

(58) Field of Classification Search
USPC .......................................................... 297/362
See application file for complete search history.

(56) References Cited

U.S. PATENT DOCUMENTS

| | | | |
|---|---|---|---|
| 2018/0111510 A1* | 4/2018 | Takada .................. | B60N 2/166 |
| 2018/0194250 A1* | 7/2018 | Arakawa ................ | B60N 2/165 |
| 2020/0223342 A1* | 7/2020 | Ito .......................... | B60N 2/995 |

* cited by examiner

US 12,090,895 B2

SEAT ASSEMBLY WITH POWER EASY ENTRY HAVING CONCENTRIC MOTION

CROSS-REFERENCE TO RELATED APPLICATIONS

This application claims priority to and all the benefits of U.S. Provisional Application 62/976,555, filed on Feb. 14, 2020 and entitled "Seat with Power Pitch Easy Entry having Concentric Motion," the disclosure of which is hereby incorporated by reference in its entirety.

BACKGROUND OF THE INVENTION

1. Field of the Invention

The present invention relates to a seat assembly adapted to be mounted to a floor of an automotive vehicle for movement between a plurality of positions.

2. Description of Related Art

Seat assemblies adapted to be mounted to a floor of an automotive vehicle for movement between a plurality of positions are known in the art. Typical seat assemblies include a seat cushion for supporting an occupant in the automotive vehicle and a seat back pivotally coupled to the seat cushion. The seat assemblies also typically include a seat base adapted for mounting the seat assembly within the automotive vehicle. At least one link extends longitudinally between a first end rotatably coupled to the seat cushion at a first pivot point and a second end rotatably coupled to the seat base at a second pivot point. A motor and a power recliner assembly are often operatively coupled to the at least one link at the second pivot point. The motor and power recliner assembly rotate the link to move the seat assembly between a first position and a second position, and the motor and power recliner assembly further hold the seat assembly in either the first position or the second position as desired by the occupant. However, conventional motors and power recliner assemblies operatively coupled to the at least one link are continuously engaged and produce an eccentric motion. Therefore, movement of the seat assembly between the first position and the second position often results in undesirable "wobbling" of the seat assembly that is likely to be detected by the occupant.

SUMMARY OF THE INVENTION

According to one aspect of the invention, a seat assembly adapted to be mounted to a floor of an automotive vehicle is provided for movement between a plurality of positions. The seat assembly includes a seat cushion for supporting an occupant in the automotive vehicle and a seat back pivotally coupled to the seat cushion. The seat assembly further includes a seat base adapted for mounting the seat assembly within the automotive vehicle. At least one link extends longitudinally between a first end pivotally coupled to the seat cushion and a second end pivotally coupled to the seat base. Pivoting of the at least one link moves the seat assembly between a first position and a second position. A recliner mechanism is operatively coupled to the at least one link, and the recliner mechanism is operable between a locked condition for preventing pivoting of the at least one link and an unlocked condition for allowing pivoting of the at least one link. A sector gear is fixedly coupled to the at least one link, a pinion gear is operatively coupled to the sector gear, and a motor rotatably drives the pinion gear. Actuation of the motor when the recliner mechanism is in the unlocked condition rotates the pinion gear, causing the sector gear to rotate for pivoting the at least one link to move the seat assembly between the first position and the second position.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 2C:
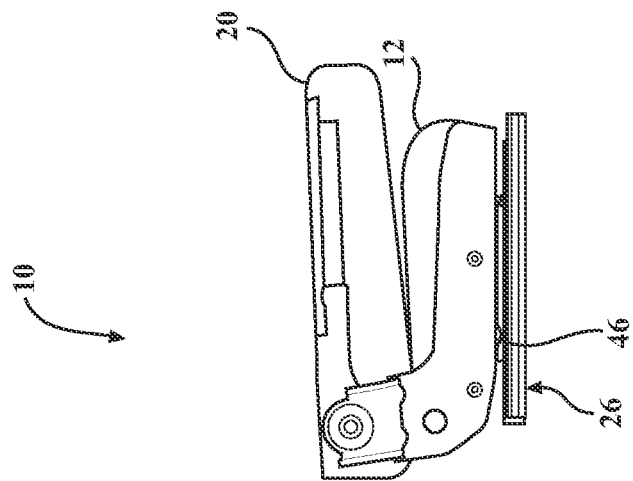
FIG. 2C is a side view of the seat assembly of FIG. 1 showing the seat cushion in a stow position.

Referring to the Figures, wherein like numerals indicate like or corresponding parts throughout the several views, a seat assembly adapted to be mounted to a floor of an automotive vehicle for movement between a plurality of positions is shown generally at 10. The seat assembly 10 includes a seat cushion 12 extending between a front portion 14 and a rear portion 16 with opposing lateral sides 18a, 18b. A seat back 20 is pivotally coupled to the rear portion 16 of the seat cushion 12 for pivotal movement of the seat back 20 between a plurality of reclined positions and a fold-flat position in which the seat back 20 overlaps the seat cushion 12, as shown in FIG. 2C. The seat assembly 10 further includes a linkage assembly, shown generally at 22, rotatably coupled between the seat cushion 12 and a seat base 24. The linkage assembly 22 is rotatable for moving and tilting the seat assembly 10 relative to the floor of the automotive vehicle between a plurality of positions, as shown in FIGS.

Figure 3:
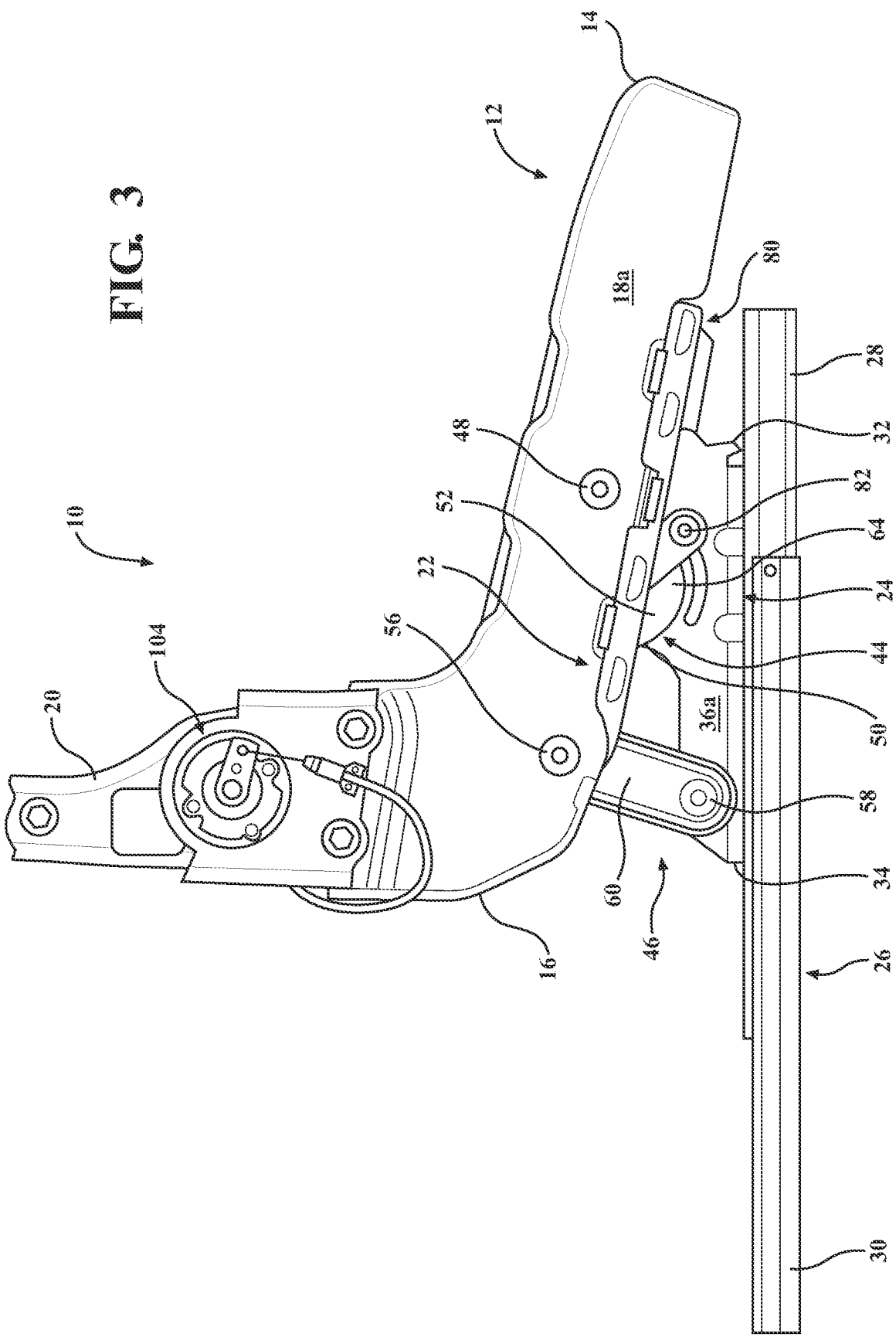
FIG. 3 is a side view of the seat assembly of FIG. 1 further showing the seat cushion in the easy entry position.

2A-2C. The seat base 24 may be mounted directly to the floor of the automotive vehicle or fixedly coupled to a seat track assembly 26 for providing fore and aft movement of the seat assembly 10 within the automotive vehicle, as shown in FIG. 3. The seat track assembly 26 includes a pair of sliding tracks 28 fixedly coupled to the seat base 24, the sliding tracks 28 repositionable along a pair of laterally spaced apart fixed tracks 30 mounted to the floor of the automotive vehicle.

Figure 4:
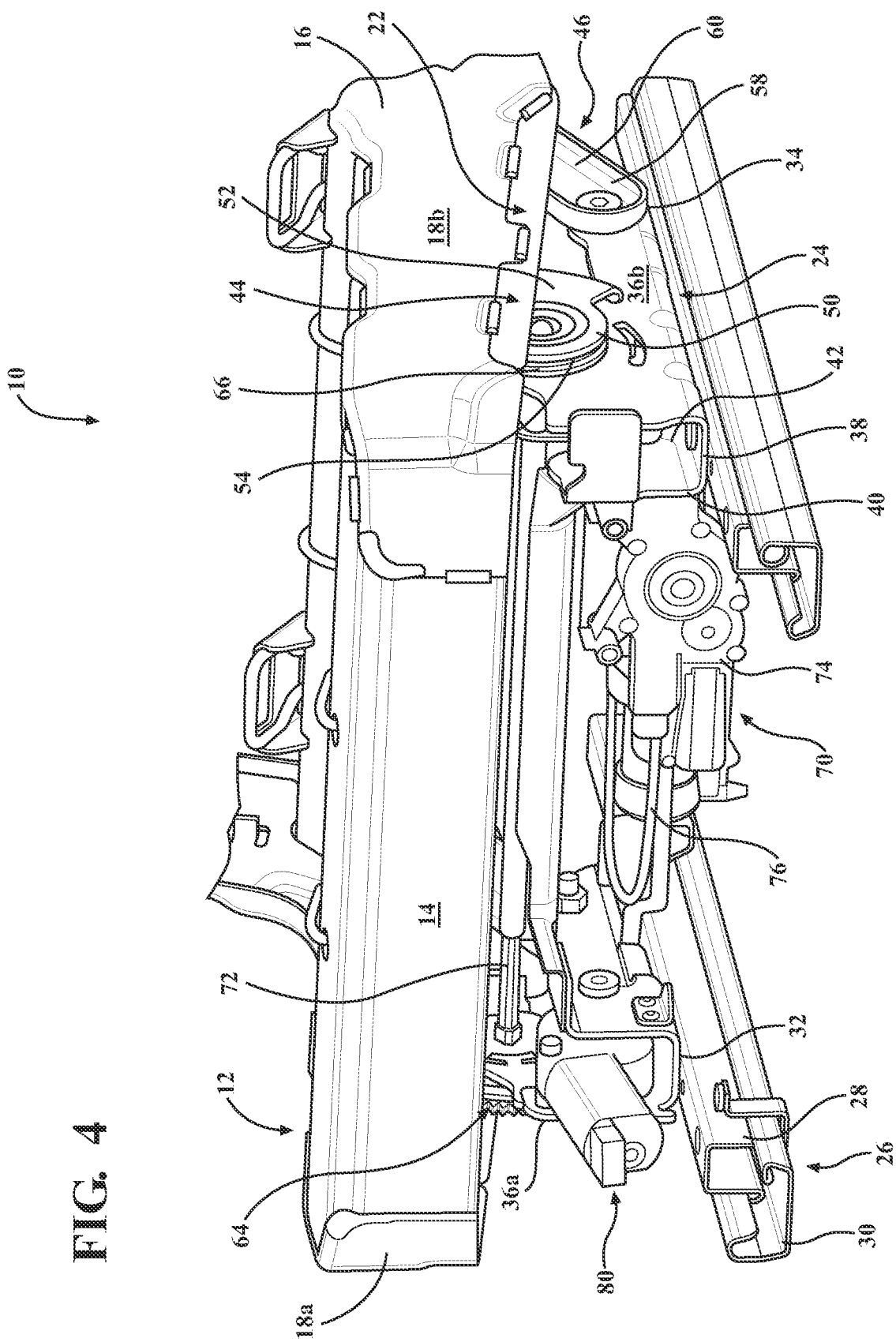
FIG. 4 is a fragmentary front perspective view of the seat assembly of FIG. 1 showing the seat cushion in the design position.
Figure 5:
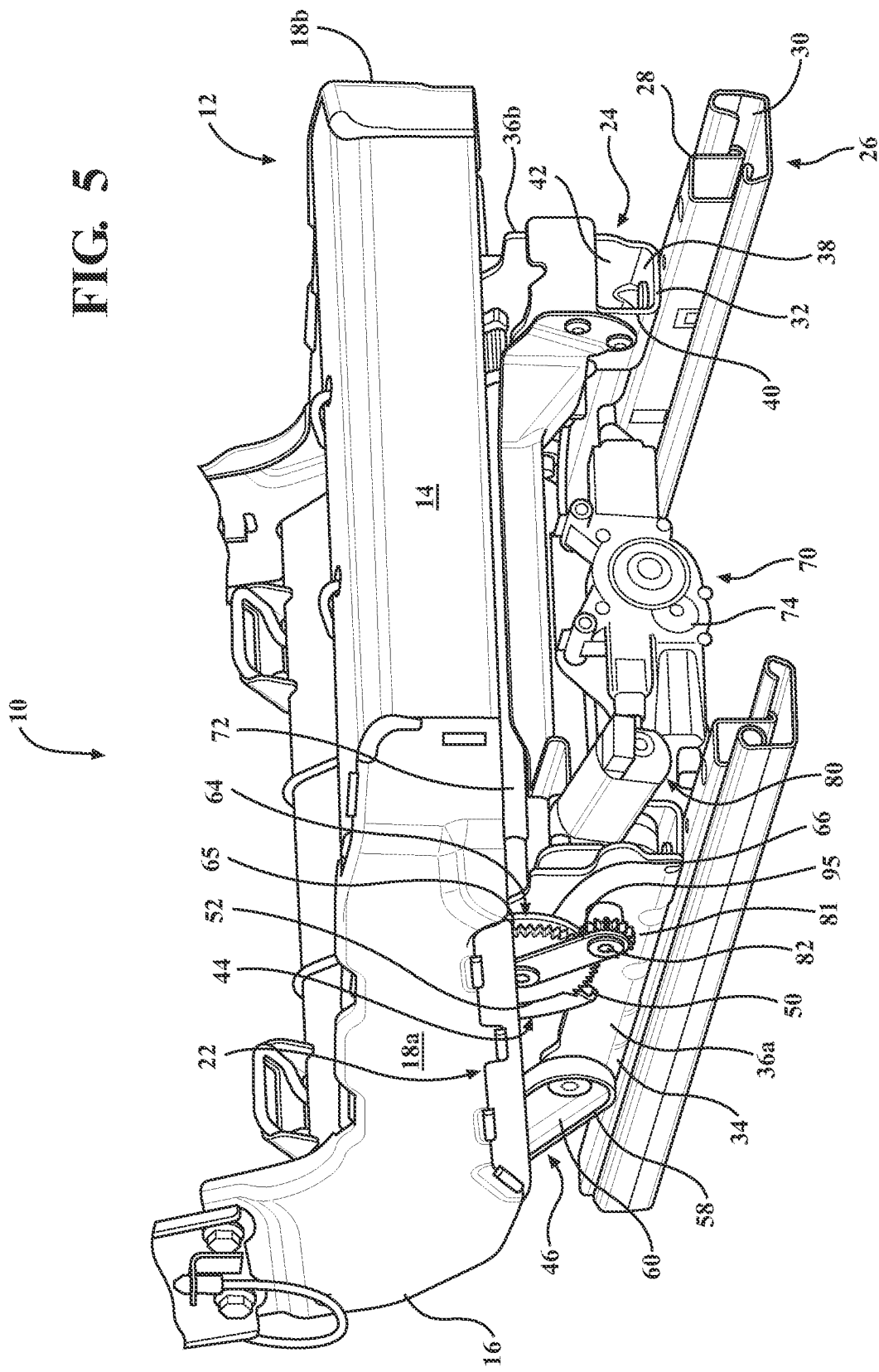
FIG. 5 is an alternative fragmentary front perspective view of the seat assembly of FIG. 1 further showing the seat cushion in the design position.
Figure 6:
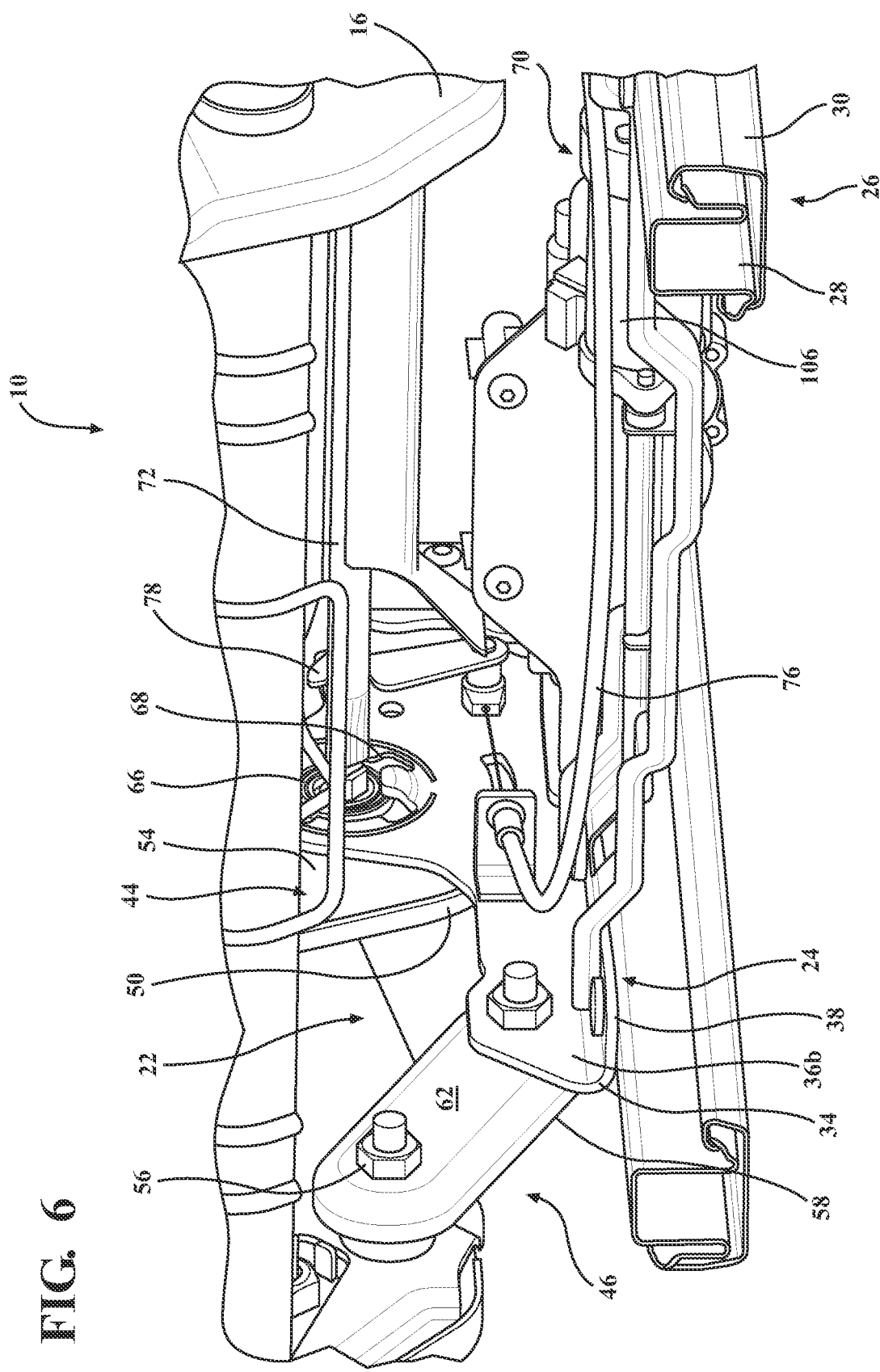
FIG. 6 is a fragmentary rear perspective view of the seat assembly of FIG. 1 showing the seat cushion in the design position.

Referring to FIGS. 4-6, the seat base 24 extends between a front portion 32 and an opposite rear portion 34 with a pair of opposing lateral side walls 36a, 36b disposed below the respective lateral sides 18a, 18b of the seat cushion 12. A floor section 38 extends inwardly from each lateral side wall 36a, 36b of the seat base 24. The floor section 38 at each lateral side wall 36a, 36b is secured to the respective sliding track 28 to couple the seat base 24 to the seat track assembly 26, as shown in FIG. 6, and provide sliding movement of the seat assembly 10 within the automotive vehicle. Referring to FIGS. 4 and 5, the front portion 32 of the seat base 24 further includes an inner wall 40 extending upwardly from each floor section 38. Each inner wall 40 is spaced from, and extends substantially parallel to, the respective lateral side wall 36a, 36b to define a generally U-shaped channel 42 therebetween.

Figure 2B:
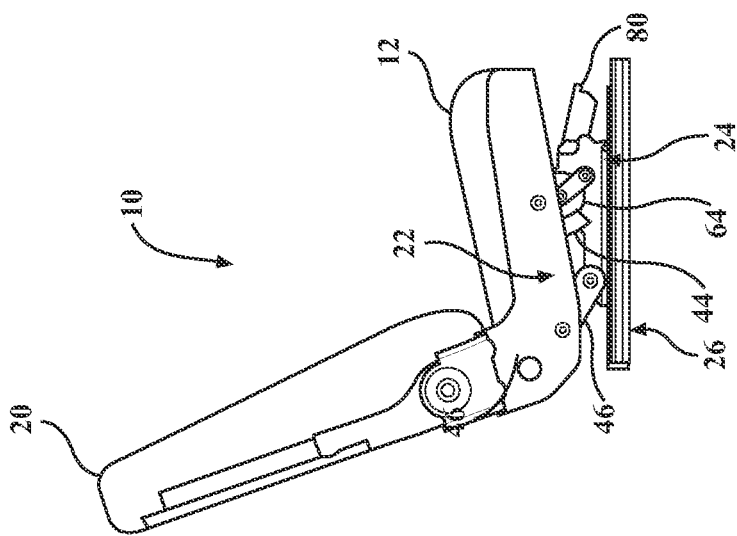
FIG. 2B is a side view of the seat assembly of FIG. 1 further showing the seat cushion in the design position.
Figure 2A:
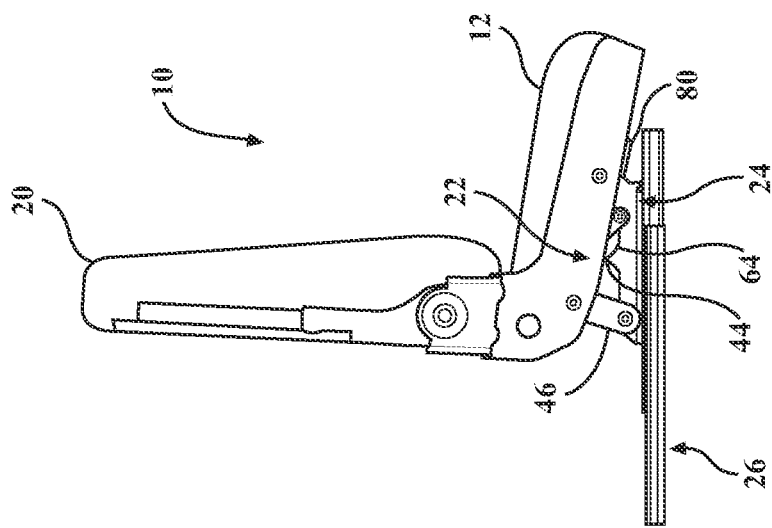
FIG. 2A is a side view of the seat assembly of FIG. 1 showing the seat cushion in the easy entry position.

Referring to FIGS. 4 and 5, the linkage assembly 22 is a four-bar linkage having a pair of laterally spaced apart front links 44 and a pair of laterally spaced apart rear links 46, where each pair of front links 44 and each pair of rear links 46 are substantially the same. However, it is to be appreciated that the linkage assembly 22 may include any suitable number of links or link pairs without varying the scope of the invention. The linkage assembly 22 is rotatable for moving and tilting the seat assembly 10 relative to the floor of the automotive vehicle between a first position, a second position, and a third position. The first position includes any one of a design position, shown in FIGS. 2B and 7, where the seat assembly 10 is spaced from the floor of the automotive vehicle to support an occupant, an easy entry position, shown in FIGS. 2A and 8, where the seat assembly 10 tilts forwardly and downwardly toward the floor of the automotive vehicle for increased ingress and egress behind the seat assembly 10, and a stow position, shown in FIGS. 2C and 9, where the seat assembly 10 lowers toward the floor of the automotive vehicle for increased cargo room therein. Similarly, the second position includes any one of the design, easy entry, and stow positions, and the third position also includes any one of the design, easy entry, and stow positions. Therefore, rotation of the linkage assembly 22 moves the seat assembly 10 between any of the design, easy entry, and stow positions, as desired. It is to be appreciated that the seat assembly 10 may be further moveable to any number of alternative positions through rotation of the linkage assembly 22 without varying the scope of the invention.

Figure 7:
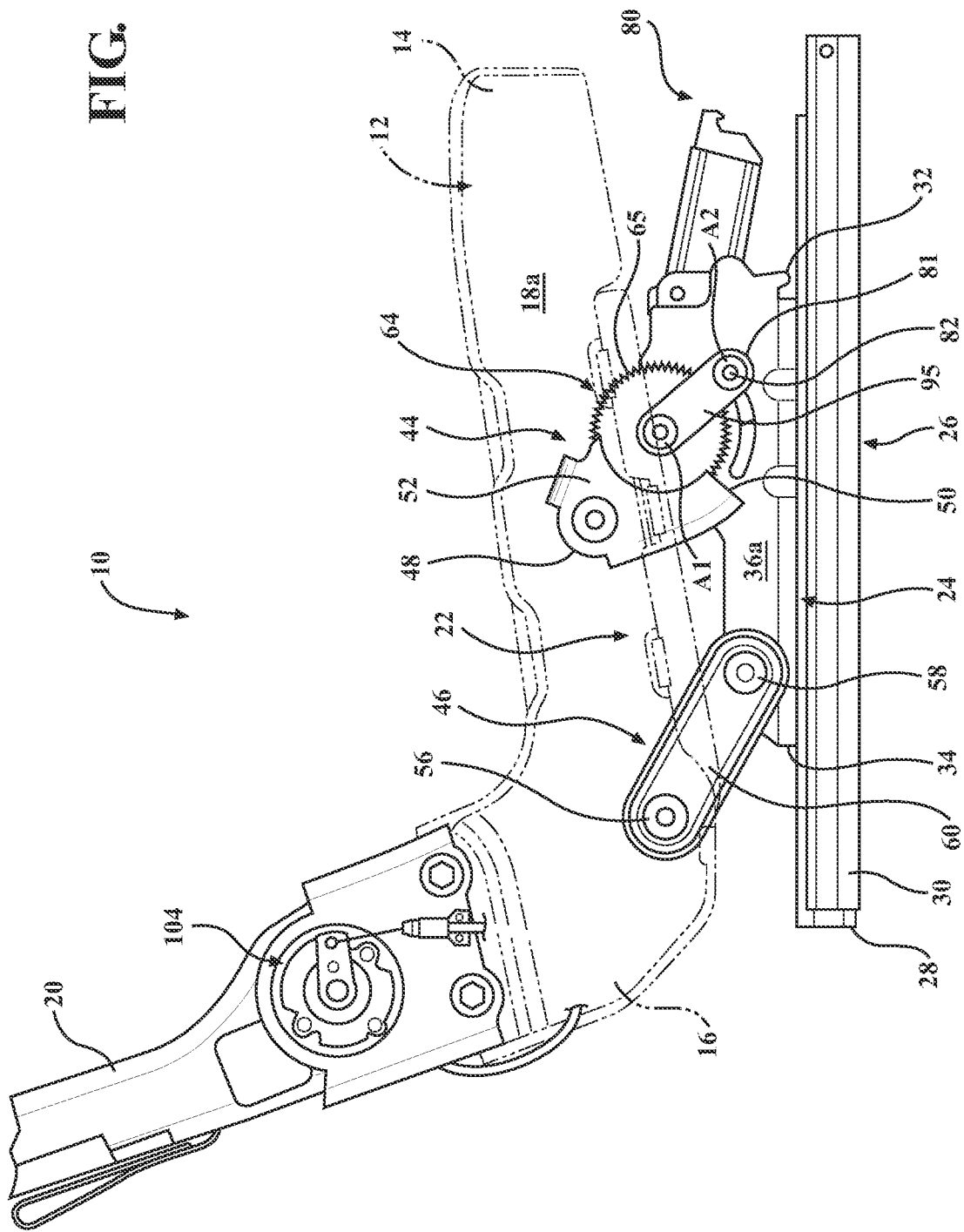
FIG. 7 is a fragmentary side view of the seat assembly of FIG. 1 showing the seat cushion in the design position.

Referring to FIGS. 4-7, the front links 44 are disposed at each lateral side 18a, 18b of the seat cushion 12 adjacent to the front portion 14 thereof, and the rear links 46 are disposed at each lateral side 18a, 18b of the seat cushion 12 adjacent to the rear portion 16 thereof. Each front link 44 extends longitudinally between a first end 48 and an opposite second end 50 with an outward-facing lateral side 52 and an inward-facing medial side 54. The lateral side 52 of each front link 44 at the first end 48 thereof is rotatably coupled to the front portion 14 of the seat cushion 12, as shown in FIG. 7. The medial side 54 of each front link 44 at the second end 50 thereof is rotatably coupled to the respective lateral side wall 36a, 36b at the front portion 32 of the seat base 24, as shown in FIG. 4. Similarly, each rear link 46 extends longitudinally between a first end 56 and an opposite second end 58 with an outward-facing lateral side 60 and an inward-facing medial side 62. The lateral side 60 of each rear link 46 at the first end 56 thereof is rotatably coupled to the rear portion 16 of the seat cushion 12, as shown in FIG. 7. The medial side 62 of each rear link 46 at the second end 58 thereof is rotatably coupled to the respective lateral side wall 36a, 36b at the rear portion 34 of the seat base 24, as shown in FIG. 6. Referring to FIGS. 7-10, an external sector gear 64 is fixedly coupled to the lateral side 52 of one of the front links 44 at the second end 50 thereof. The sector gear 64 defines a central rotational axis A1 and includes a plurality of radially-extending teeth 65 disposed along a portion of the sector gear 64 facing away from the first end 48 of the one of the front links 44. Rotation of the sector gear 64 correspondingly rotates the one of the front links 44, and therefore, the linkage assembly 22.

Figure 10:
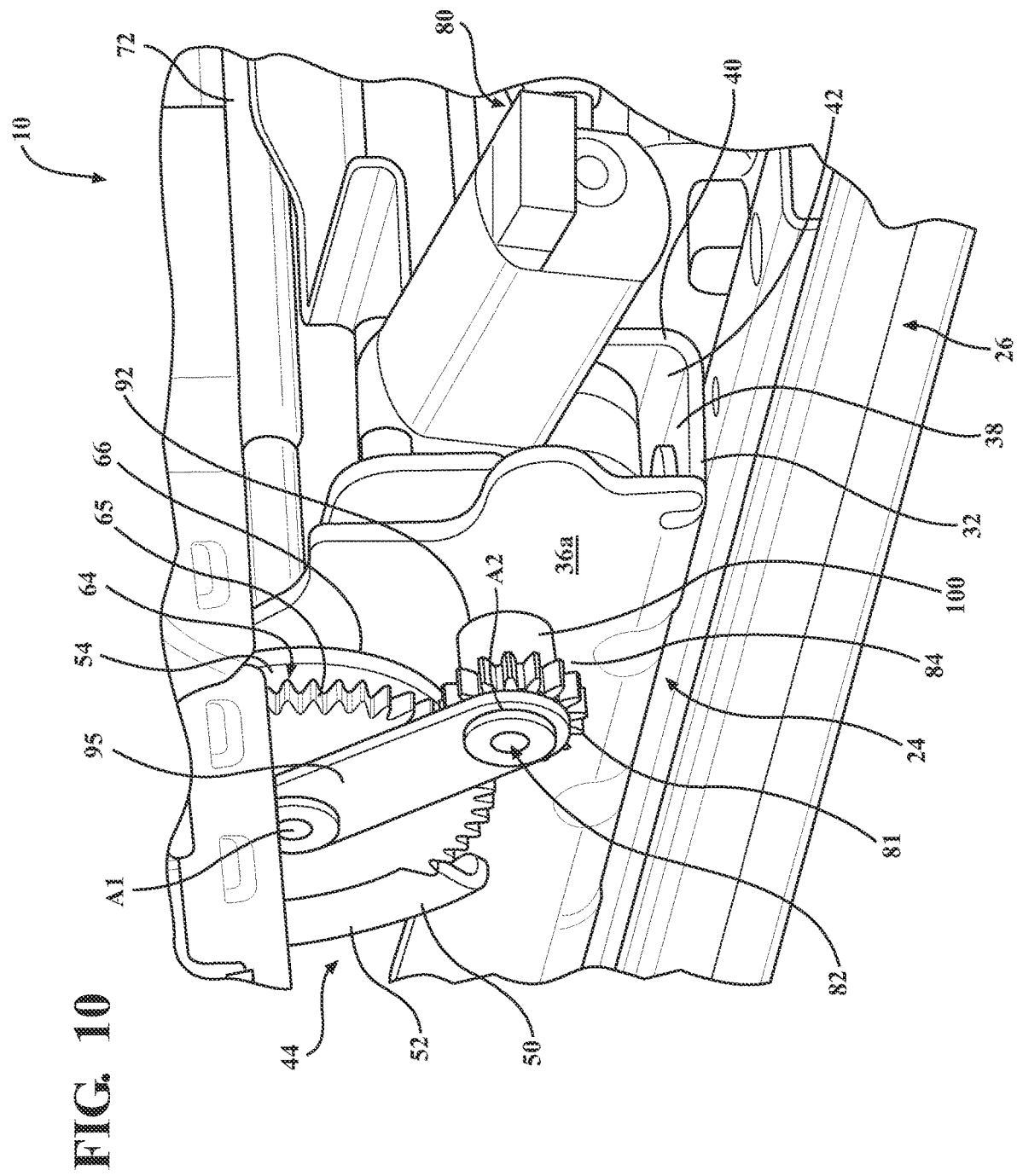
FIG. 10 is an enlarged fragmentary perspective view of the seat assembly of FIG. 1 showing a cushion motor linked to a pinion gear meshingly engaged with a sector gear.
Figure 11:
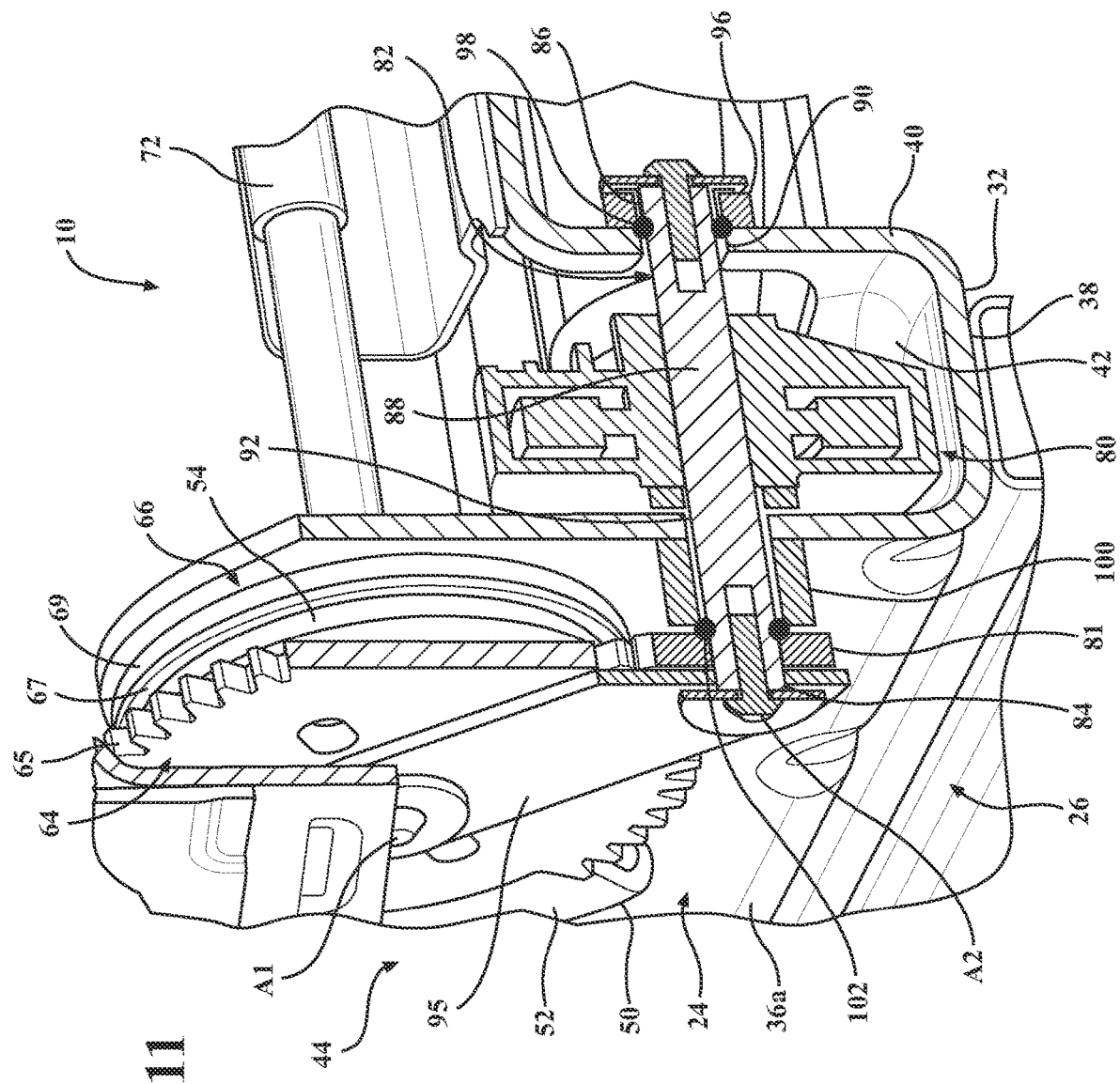
FIG. 11 is a cross-sectional fragmentary perspective view of the seat assembly of FIG. 10 showing a drive rod of the cushion motor linked to the pinion gear.

Referring to FIGS. 4, 10, and 11, the seat assembly further includes a recliner mechanism 66 operatively coupled to each front link 44 for selectively allowing rotation of the linkage assembly 22 to move the seat assembly 10 between the plurality of positions. Each recliner mechanism 66 is operatively coupled between the medial side 54 of the respective front link 44 at the second end 50 thereof and the respective lateral side wall 36a, 36b at the front portion 32 of the seat base 24. The recliner mechanisms 66 include a lateral portion 67 rotatably coupled to a medial portion 69 for relative rotation therebetween. Referring to FIG. 11, the lateral portion 67 of each recliner mechanism 66 is fixed to the respective front link 44, and the medial portion 69 of each recliner mechanism 66 is fixed to the seat base 24. An aperture 68 extends through each lateral side wall 36a, 36b of the seat base 24 adjacent to the respective recliner mechanism 66, as shown in FIG. 6.

The recliner mechanisms 66 are operable between a locked condition and an unlocked condition. In the locked condition, the lateral and medial portions 67, 69 of each recliner mechanism 66 are prevented from rotating relative to each other for preventing rotation of the front link 44 at the second end 50 thereof, therefore correspondingly preventing rotation of the linkage assembly 22 to retain the seat assembly 10 in a desired one of the plurality of positions. In the unlocked condition, the lateral and medial portions 67, 69 of each recliner mechanism 66 are allowed to rotate relative to each other for allowing rotation of the front link 44 at the second end 50 thereof, therefore correspondingly allowing rotation of the linkage assembly 22 for moving the seat assembly 10 to the desired one of the plurality of positions. One potential type of recliner mechanism 66 for use in the seat assembly 10 is a manual disc recliner described in U.S. Pat. No. 8,459,743, the disclosure of which is hereby incorporated by reference in its entirety. However, it is to be appreciated that any suitable non-motorized recliner mechanism known in the art could be substituted for the recliner mechanism 66 without varying the scope of the invention.

Referring to FIGS. 4 and 6, an actuation assembly, shown generally at 70, is operatively coupled to each recliner mechanism 66 for selectively releasing the recliner mechanisms 66 to the unlocked condition for allowing rotation of the linkage assembly 22. The actuation assembly 70 includes a cross tube 72 adapted such that rotation of the cross tube 72 simultaneously actuates both recliner mechanisms 66. The cross tube 72 extends between each lateral side wall 36a, 36b of the seat base 24 and through the apertures 68 therein to operatively couple to each recliner mechanism 66. The actuation assembly 70 further includes an actuator 74 mounted under the seat cushion 12 between the lateral side walls 36a, 36b of the seat base 24, as shown in FIGS. 4 and 5. A Bowden-type cable 76 extends from the actuator 74, as shown in FIG. 4, and is operatively coupled to a release lever 78 which is fixedly coupled to the cross tube 72, as shown in FIG. 6. Motion transferred from the actuator 74 through the cable 76 pivots the release lever 78 to rotate the cross tube 72, thereby simultaneously actuating both recliner mechanisms 66. However, it is to be appreciated that any actuation assembly suitable for simultaneously actuating the recliner mechanisms 66 can be substituted into the seat assembly 10 without varying the scope of the invention.

Referring to FIGS. 10 and 11, the seat assembly 10 further includes a cushion motor 80 linked to a pinion gear 81 for providing concentric rotation of the linkage assembly 22 through rotational engagement of the pinion gear 81 with the sector gear 64. The cushion motor 80 is mounted within the U-shaped channel 42 at the side wall 36a of the seat base 24 adjacent to the sector gear 64. Referring to FIG. 11, the cushion motor 80 includes a drive rod 82 extending between a lateral end 84 and an opposite medial end 86 with a central portion 88 disposed therebetween. The central portion 88 is positioned within the cushion motor 80 for rotating the drive rod 82 as is known in the art, and the medial and lateral ends 86, 84 extend outside the cushion motor 80 and through the inner wall 40 and the side wall 36a defining the U-shaped channel 42. The medial end 86 of the drive rod 82 extends through a corresponding aperture 90 in the respective inner wall 40 of the seat base 24, and the lateral end 84 of the drive rod 82 extends through a corresponding aperture 92 in the respective lateral side wall 36a of the seat base 24. Referring to FIGS. 10 and 11, the pinion gear 81 is fixedly coupled to the lateral end 84 of the drive rod 82, and rotation of the drive rod 82 correspondingly rotates the pinion gear 81 along a central rotational axis A2 of the pinion gear 81. The drive rod 82 and pinion gear 81 are arranged such that teeth extending radially outward from the pinion gear 81 meshingly engage with the teeth 65 extending from the sector gear 64. The cushion motor 80 is adapted to rotate the pinion gear 81 for correspondingly rotating the sector gear 64 around rotational axis A1 to move the seat assembly 10 between the plurality of positions. The seat assembly 10 may further include a control unit operatively coupled to the cushion motor 80 to determine when to stop the cushion motor 80 for positioning the seat assembly 10 in the desired one of the plurality of positions. However, it is to be appreciated that any alternative means of determining when to stop rotation of the linkage assembly 22 for positioning the seat assembly 10 in the desired one of the plurality of positions may be used without varying the scope of the invention.

Referring to FIG. 10, a strap 95 extends between the sector gear 64 at the central rotational axis A1 thereof and the pinion gear 81 at the central rotational axis A2 thereof to keep the sector gear 64 and the pinion gear 81 fully meshingly engaged during rotation therebetween. Referring to FIG. 11, a medial hub 96 is fixedly coupled to the drive rod 82 between the medial end 86 thereof and the inner wall 40 of the seat base 24 to rotatably support the drive rod 82 through the aperture 90, and a plurality of medial bearings 98 are mounted between the medial hub 96 and the inner wall 40 to reduce friction therebetween. Similarly, a lateral hub 100 is fixedly coupled to the drive rod 82 between the pinion gear 81 and the respective lateral wall 36a of the seat base 24 to rotatably support the drive rod 82 through the aperture 92, and a plurality of lateral bearings 102 are mounted between the lateral hub 100 and the respective lateral wall 36a for reducing friction therebetween.

Figure 8:
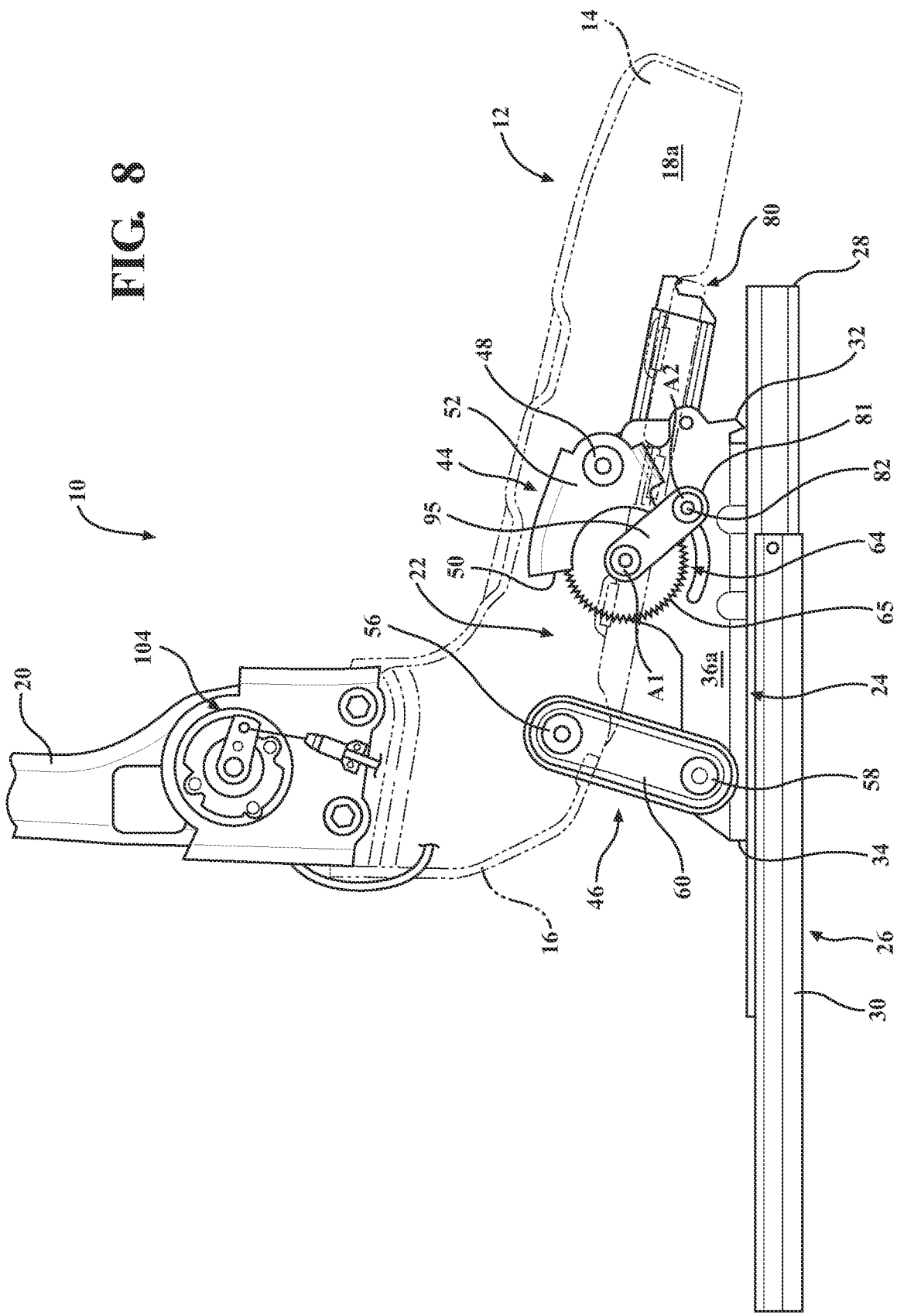
FIG. 8 is a fragmentary side view of the seat assembly of FIG. 1 showing the seat cushion in the easy entry position.
Figure 9:
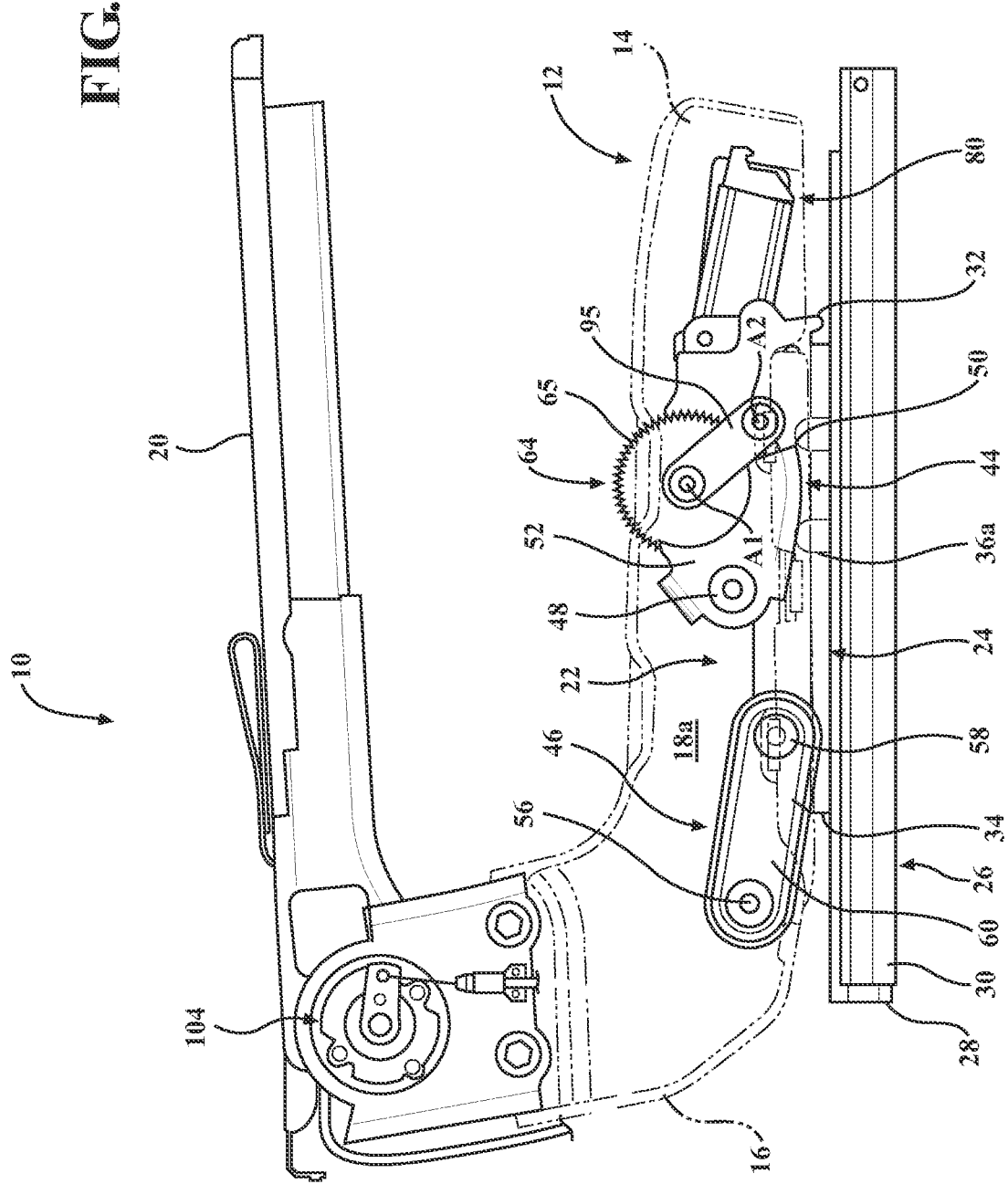
FIG. 9 is a fragmentary side view of the seat assembly of FIG. 1 showing the seat cushion in the stow position.

A seat back pivot mechanism 104 is operatively coupled between the seat back 20 and the seat cushion 12 for pivoting the seat back 20 relative to the seat cushion 12 between the plurality of reclined positions and the fold-flat position in which the seat back 20 overlaps the seat cushion 12, as shown in FIGS. 7-9. One potential type of seat back pivot mechanism 104 for use between the seat back 20 and seat cushion 12 is a manual recliner described in U.S. Pat. No. 7,766,428, the disclosure of which is hereby incorporated by reference in its entirety. Alternatively, the seat back pivot mechanism 104 could instead be a power recliner as described in U.S. Pat. No. 8,746,796, the disclosure of which is hereby incorporated by reference in its entirety. Referring to FIG. 6, a track motor 106 is operatively coupled to gearboxes for selectively providing sliding motion between the fixed tracks 30 and the sliding tracks 28 of the seat track assembly 26. Alternatively, the seat track assembly 26 could instead include a manual latch to selectively lock and unlock the sliding tracks 28 from the fixed tracks 30 to allow sliding motion of the seat assembly 10. One potential type of seat track assembly 26 is described in U.S. Pat. No. 9,415,701, the disclosure of which is hereby incorporated by reference in its entirety. It should be appreciated, however, that any suitable seat back pivot mechanism 104 known in the art could be substituted between the seat back 20 and the seat cushion 12, and any suitable track motor 106 and associated gearboxes known in the art could be integrated with the seat track assembly 26, without varying the scope of the invention.

Figure 1:
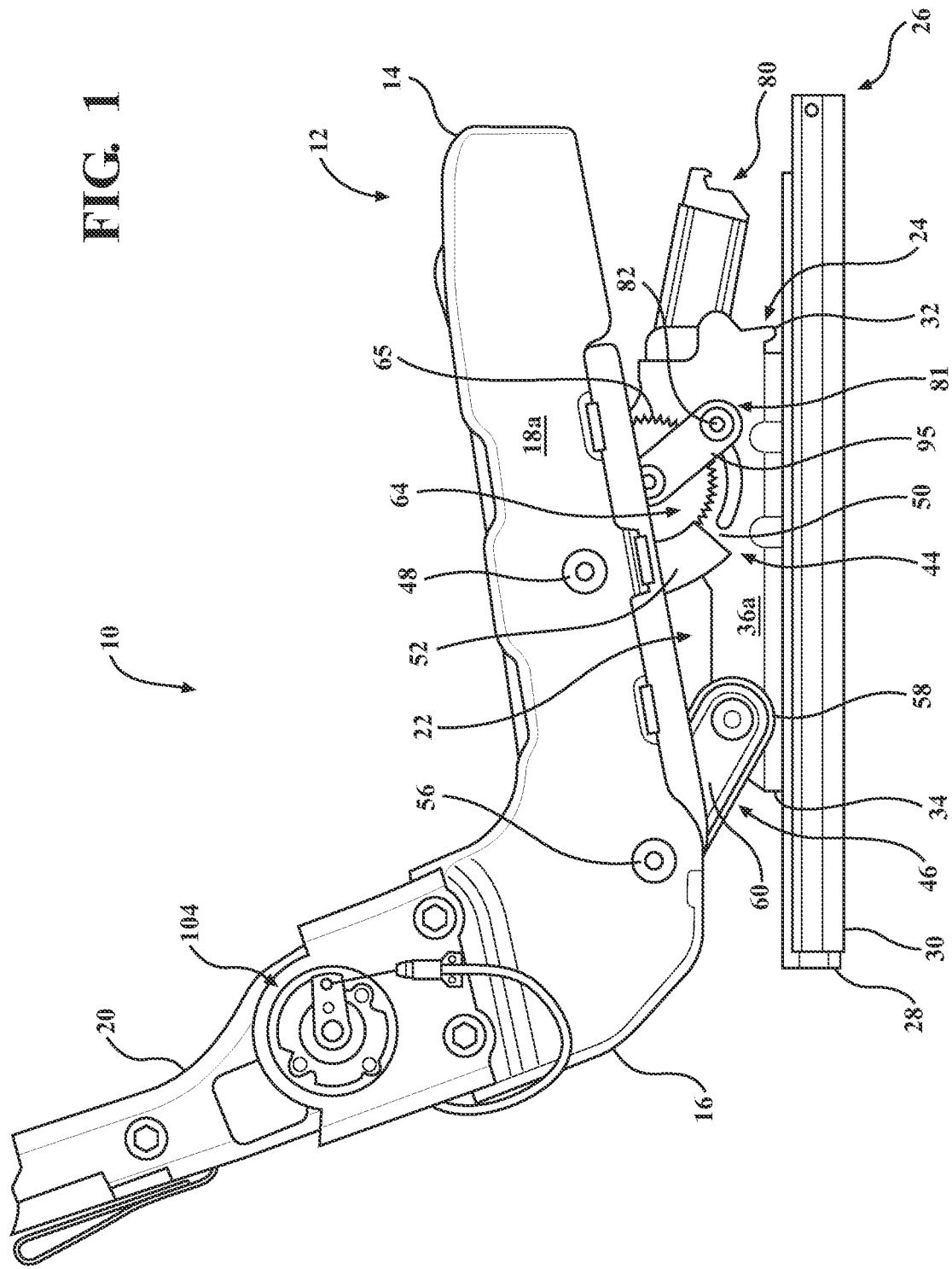
FIG. 1 is a side view of a seat assembly for use in an automotive vehicle showing a seat cushion in a design position.

In operation, the recliner mechanisms 66 of the seat assembly 10 are typically disposed in the locked condition to retain the seat assembly 10 in the desired one of the plurality of positions. For example, the recliner mechanisms 66 may be locked to retain the seat assembly 10 in the design position, as shown in FIGS. 1 and 7, for supporting the occupant during operation of the automotive vehicle. With the recliner mechanisms 66 in the locked condition, the lateral and medial portions 67, 69 thereof are prevented from rotating relative to each other, and the linkage assembly 22 is correspondingly prevented from rotating for moving the seat assembly 10 from the design position. The sector gear 64 is held in place, and the cushion motor 80 is unable to rotate the sector gear 64 via meshing engagement with the pinion gear 81. To move the seat assembly 10 from the design position to another of the plurality of positions, such as the easy entry position for increased ingress and egress behind the seat assembly 10, the actuator 74 transmits motion through the cable 76 to pivot the release lever 78, which rotates the cross tube 72. Rotation of the cross tube 72 simultaneously actuates the recliner mechanisms 66 to the unlocked condition to allow relative rotation between the lateral and medial portions 67, 69 thereof, thereby allowing rotation of the linkage assembly 22. Once the recliner mechanisms 66 are unlocked, the cushion motor 80 is actuated to rotate the drive rod 82, which correspondingly rotates the pinion gear 81 around rotational axis A2. Rotation of the pinion gear 81 around rotational axis A2 rotates the sector gear 64 around rotational axis A1, which correspondingly and concentrically rotates the linkage assembly 22 to move the seat assembly 10 from the design position to the easy entry position, as shown in FIGS. 3 and 8. With the seat assembly 10 now in the desired one of the plurality of positions, the recliner mechanisms 66 may be returned to the locked condition for preventing rotation of the linkage assembly 22 and movement of the seat assembly 10. It is to be appreciated that movement of the seat assembly 10 between any other combination of positions (e.g., between the stow position and the easy entry position, between the design position and the stow position, etc.) is accomplished in a substantially similar manner.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A seat assembly adapted to be mounted to a floor of an automotive vehicle for movement between a plurality of positions, the seat assembly comprising:
    a seat cushion for supporting an occupant in the automotive vehicle and a seat back pivotally coupled to the seat cushion;
    a seat base adapted for mounting the seat assembly within the automotive vehicle;
    at least one link extending longitudinally between a first end pivotally coupled to the seat cushion and a second end pivotally coupled to the seat base, wherein pivoting of the at least one link moves the seat assembly between a first position and a second position;
    a recliner mechanism operatively coupled to the at least one link, the recliner mechanism operable between a locked condition for preventing pivoting of the at least one link and an unlocked condition for allowing pivoting of the at least one link;
    a sector gear fixedly coupled to the at least one link;
    a pinion gear meshingly engaged with the sector gear;
    a strap extending between the sector gear and the pinion gear to keep the sector gear fully meshed with the pinion gear; and
    a motor rotatably driving the pinion gear,
    wherein actuating the motor when the recliner mechanism is in the unlocked condition rotates the pinion gear, causing the sector gear to rotate for pivoting the at least one link to move the seat assembly between the first position and the second position.

2. The seat assembly of claim 1 wherein the first position of the seat assembly includes one of a design position in which the seat assembly is spaced from the floor of the automotive vehicle to support an occupant, an easy entry position in which the seat assembly tilts forwardly and downwardly toward the floor of the automotive vehicle for increased ingress and egress behind the seat assembly, and a stow position in which the seat assembly lowers toward the floor of the automotive vehicle for increased cargo room therein.

3. The seat assembly of claim 2 wherein the second position of the seat assembly includes one of the design position, the easy entry position, and the stow position.

4. The seat assembly of claim 3 wherein the at least one link is further pivotable to move the seat assembly to a third position, wherein the third position includes one of the design position, the easy entry position, and the stow position.

5. The seat assembly of claim 4 wherein pivoting of the at least one link moves the seat assembly between any of the first position, the second position, and the third position.

6. The seat assembly of claim 5 wherein the sector gear has a plurality of teeth extending radially outward therefrom for engagement with the pinion gear.

7. The seat assembly of claim 6 further comprising a drive rod operatively extending from the motor and fixedly coupled to the pinion gear for rotatably driving the pinion gear.

8. The seat assembly of claim 7 wherein the motor is fixedly coupled to the seat base.

9. The seat assembly of claim 8 wherein the at least one link includes an outward-facing lateral side and an opposite, inward-facing medial side, and the sector gear is fixedly coupled to the lateral side at the second end thereof.

10. The seat assembly of claim 9 wherein the recliner mechanism is operatively coupled between the seat base and the medial side of the at least one link at the second end thereof.

11. The seat assembly of claim 10 wherein the sector gear defines a first rotational axis (A1) and the pinion gear defines a second rotational axis (A2), the strap extending therebetween to keep the sector gear fully meshed with the pinion gear.

12. The seat assembly of claim 11 further comprising an actuation assembly operatively coupled to the recliner mechanism for selectively actuating the recliner mechanism between the locked condition and the unlocked condition to allow pivoting of the at least one link.

13. The seat assembly of claim 12 further comprising a seat track assembly fixedly coupled to the seat base for providing fore and aft movement of the seat assembly within the automotive vehicle.

14. The seat assembly of claim 13 further comprising a motor assembly operatively coupled to the seat track assembly for moving the seat assembly fore and aft within the automotive vehicle.

15. The seat assembly of claim 14 further comprising a seat back pivot mechanism operatively coupled between the seat back and the seat cushion for pivoting the seat back relative to the seat cushion between a plurality of reclined positions and a folded position in which the seat back overlaps the seat cushion.

16. The seat assembly of claim 15 wherein the at least one link includes a front link and a rear link to form a four-bar linkage, the front and rear links each pivotally coupled between the seat cushion and the seat base to move the seat assembly between the first, second, and third positions.

17. The seat assembly of claim 16 wherein the sector gear is fixedly coupled to the front link of the four-bar linkage and the recliner mechanism is operatively coupled between the front link of the four-bar linkage and the seat base.

* * * * *